United States Patent
Uensal et al.

(10) Patent No.: US 7,229,553 B2
(45) Date of Patent: Jun. 12, 2007

(54) METHOD FOR PRODUCING A MEMBRANE MADE OF BRIDGED POLYMER AND A FUEL CELL

(75) Inventors: Oemer Uensal, Mainz (DE); Joachim Kiefer, Losheim am See (DE)

(73) Assignee: PEMEAS GmbH, Frankfurt am Main (DE)

( * ) Notice: Subject to any disclaimer, the term of this patent is extended or adjusted under 35 U.S.C. 154(b) by 377 days.

(21) Appl. No.: 10/468,988

(22) PCT Filed: Mar. 1, 2002

(86) PCT No.: PCT/EP02/02215

§ 371 (c)(1),
(2), (4) Date: Sep. 25, 2003

(87) PCT Pub. No.: WO02/070592

PCT Pub. Date: Sep. 12, 2002

(65) Prior Publication Data

US 2004/0118773 A1    Jun. 24, 2004

(30) Foreign Application Priority Data

Mar. 7, 2001    (DE) ............................... 101 10 752

(51) Int. Cl.
*B01D 39/00*    (2006.01)
*C08J 5/20*    (2006.01)
*H01M 8/10*    (2006.01)
*H01M 4/96*    (2006.01)
*B01D 53/22*    (2006.01)

(52) U.S. Cl. .......................... 210/500.28; 210/500.27; 210/500.39; 521/27; 521/33; 429/30; 429/33; 429/41; 429/44; 96/4

(58) Field of Classification Search ........... 210/500.27, 210/500.37, 500.38, 500.39, 500.28, 638; 264/41; 429/30, 33, 41, 44; 204/296, 252; 521/33, 27; 96/4
See application file for complete search history.

(56) References Cited

U.S. PATENT DOCUMENTS

| | | | | |
|---|---|---|---|---|
| 4,693,825 A | * | 9/1987 | Trouw | 210/500.28 |
| 4,933,083 A | * | 6/1990 | Jones, Jr. | 210/490 |
| 5,525,436 A | * | 6/1996 | Savinell et al. | 429/30 |
| 5,599,639 A | | 2/1997 | Sansone et al. | |
| 6,623,639 B2 | * | 9/2003 | Barss et al. | 210/500.23 |
| 6,790,553 B1 | * | 9/2004 | Yamamoto | 429/33 |
| 6,946,211 B1 | * | 9/2005 | Bjerrum et al. | 429/33 |
| 2005/0074654 A1 | * | 4/2005 | Kiefer et al. | 429/33 |
| 2005/0175879 A1 | * | 8/2005 | Kiefer et al. | 429/33 |
| 2005/0256296 A1 | * | 11/2005 | Kiefer et al. | 528/327 |

FOREIGN PATENT DOCUMENTS

WO    WO 00/44816    8/2000

* cited by examiner

*Primary Examiner*—Ana Fortuna
(74) *Attorney, Agent, or Firm*—Connolly Bove Lodge & Hutz LLP (57) ABSTRACT

Method for producing a membrane made of bridged polymer and a fuel cell. The present invention relates to a membrane comprising a bridged polymer which is produced by a selected process. The membrane of the invention displays a significantly improved fracture toughness (elongation at break/tensile strength) with virtually unchanged swelling behavior. The membranes of the invention are suitable for producing membrane-electrode units for fuel cells.

22 Claims, 2 Drawing Sheets

METHOD FOR PRODUCING A MEMBRANE MADE OF BRIDGED POLYMER AND A FUEL CELL

The present invention relates to a membrane comprising a bridged polymer, to a process for producing it and to a fuel cell comprising such a membrane.

A fuel cell usually comprises an electrolyte and two electrodes separated by the electrolyte. In such a fuel cell, a fuel such as hydrogen gas is fed to one of the two electrodes and an oxidant such as oxygen gas is fed to the other electrode and chemical energy from oxidation of the fuel is thereby converted into electric energy.

The electrolyte is permeable to hydrogen ions, i.e. protons, but not to reactive gases such as the hydrogen gas and the oxygen gas.

A fuel cell generally has a plurality of individual cells known as MEUs (membrane-electrode units) which each comprise an electrolyte and two electrodes separated by the electrolyte.

Electrolytes employed for the fuel cell are solids such as polymer electrolyte membranes or liquids such as phosphoric acid. In recent times, attention has been directed at polymer electrolyte membranes as electrolytes for fuel cells. Materials used for polymer electrolyte membranes are, for example, perfluorosulfonic acid polymers and complexes of basic polymers and strong acids.

The perfluorosulfonic acid polymer generally has a perfluorinated hydrocarbon skeleton, e.g. a copolymer of tetrafluoroethylene and trifluorovinyl, and a side chain bearing a sulfonic acid group, e.g. a side chain bearing a sulfonic acid group bound to a perfluoroalkylene group, bound thereto. The sulfonic acid group can release a hydrogen ion and is thus converted into an anion and therefore conducts protons.

Polymer electrolyte membranes comprising complexes of basic polymers and strong acids have been developed. Thus, WO 96/13872 and the corresponding U.S. Pat. No. 5,525,436 describe a process for producing a proton-conducting polymer electrolyte membrane, in which a basic polymer such as a polybenzimidazole is dipped into a strong acid such as phosphoric acid, sulfuric acid, etc.

Such a fuel cell in which such a polymer electrolyte membrane is used has the advantage that it can be operated at temperatures of 100° C. or above.

J. Electrochem. Soc., Volume 142, No. 7, 1995, pp. L121–L123, describes the doping of a polybenzimidazole in phosphoric acid.

WO 97/37396 and the corresponding U.S. Pat. No. 5,716,727 describe a process for producing a polymer electrolyte membrane, in which a polybenzimidazole is dissolved in trifluoroacetic acid, the solution is then admixed with phosphoric acid and the solvent is subsequently removed.

Even when a basic polymer itself has a satisfactory mechanical strength, it can occur that the mechanical strength of the basic polymer is decreased down to an unsatisfactory level by impregnation with a strong acid for the purpose of making the polymer proton-conducting. A further improvement in the mechanical strength of the basic polymer is therefore desirable for use of the complex of the basic polymer and the strong acid in the electrolyte membrane for the fuel cell, etc.

U.S. Pat. No. 5,599,639 describes a basic polymer, and a sulfonic acid group is introduced into a basic polymer, polybenzimidazole, etc., by means of a linker such as an alkylene group, etc. The basic polymer has to take up water in order to become proton-conducting and thus be able to be used as electrolyte membrane for the fuel cell.

However, it can occur that when the basic polymer is dipped into water it swells and a satisfactory mechanical strength is not achieved.

WO 00/44816 provides starting points for improving the mechanical strength and the swelling behavior of a membrane. Here, a solution comprising a basic polymer and a bridging reagent are used for casting the membrane and bridging is subsequently carried out. These membranes, too, are still in need of improvement in respect of their mechanical strength. In particular, the fracture toughness is still unsatisfactory.

It has now been found that bridging of the basic polymers and the bridging reagent in the presence of a specific catalyst provides a remedy.

The present invention provides a membrane comprising a bridged polymer obtainable by a process comprising the following steps:

A. preparing a solution comprising a basic polymer having at least one amino group in a repeating unit and at least one bridging reagent in a suitable solvent,
B. casting a film using the solution obtained from step A),
C. removing the solvent from step A),
D. carrying out the bridging reaction in the film obtained in step C),
E. doping the film obtained in step D) with a strong acid, wherein a basic catalyst is additionally added in step A).

In general, the basic polymer is dissolved in the solvent, the solution obtained is admixed with the bridging reagent and the basic catalyst and the components are then intimately mixed.

There are no restrictions in respect of the bridging reagent as long as it is a compound having a functional group which reacts with an amino acid. The bridging reagent preferably has at least two functional groups per molecule which can react with the amino group and is generally an organic compound. Examples of such groups are epoxide groups and isocyanate groups. However, when the epoxide group and the isocyante group are present in the bridging agent molecule, the two groups react with one another, which is therefore not preferred.

The bridging reagent therefore preferably has at least two epoxide groups or isocyanate groups per molecule.

Examples of organic compounds having not less than two epoxide groups and not less than two isocyanate groups are epoxy compounds of the formula (II) and organic compounds of the formula (III). In addition, the hydrogen atoms in the epoxide groups of the epoxy compound of the formula (II) can be replaced by a halogen or a lower alkyl group.

In the above formula, $R^1$ is a hydrocarbon group having from 1 to 30 carbon atoms, for example a straight-chain or branched lower alkylene group having from 1 to 15 carbon atoms which may bear a nitro group, an oxygen atom, an epoxide group or an aryl group as substituent or a straight-chain or branched lower alkoxy group having from 1 to 15 carbon atoms which may bear a nitro group, an epoxide group or an aryl group as substituent. Aryl groups include heteroaryls having from 4 to 20 carbon atoms; particularly preferred aryls are phenyl, naphthyl and indenyl.

The term lower alkyl in the context of compounds of the formula (II) and (III) refers to an alkyl group having from 1 to 15 carbon atoms.

The term aryl or heteroaryl in the context of compounds of the formula (II) and (III) refers to an aryl or heteroaryl group having from 4 to 20 carbon atoms.

Examples of $R^1$ are the following groups:

In the above formulae, m, k and l are identical or different and are each an integer from 1 to 6.

An example of a bridging reagent having three functional groups per molecule which are capable of reacting with an amino group is the following compound:

Particularly preferred bridging reagents are bisphenol A glycidyl ether [BPAGDE] and 1,4-butanediol diglycidyl ether.

The solution obtained in step A) preferably contains from 0.1 to 7 mol % of the bridging reagent per unit of the basic polymer, more preferably from 0.5 to 6 mol % of the bridging reagent per unit of the basic polymer, and particularly preferably from 1 to 6 mol % of the bridging reagent per unit of the basic polymer. If the proportion of bridging reagent is too high, impregnation of the basic polymer with a strong acid becomes difficult. On the other hand, if the proportion of bridging reagent is too low, the mechanical strength of the polymer membrane is not improved to a sufficient extent.

The solution obtained in step A) preferably contains at least 1 percent by weight of the basic polymer and more preferably at least 2 percent by weight of the basic polymer.

The solution obtained in step A) preferably contains not more than 95 percent by weight of the basic polymer, more preferably not more than 80 percent by weight of the basic polymer and particularly preferably not more than 50 percent by weight of the basic polymer.

As basic polymer, use is made of a basic polymer having at least one amino group in a repeating unit. Since the amino group is present in the repeating unit, the polymer is basic and the amino group can react with the bridging agent. With a view to the reactivity toward the bridging agent, the amino group in the repeating unit is preferably a primary or secondary amino group.

The repeating unit in the basic polymer preferably comprises an aromatic ring containing at least one nitrogen atom. The aromatic ring is preferably a 5- or 6-membered ring which contains from 1 to 3 nitrogen atoms and may be fused with another ring, in particular another aromatic ring.

The basic polymer is preferably soluble in the solvent. Specifically, preference is given to at least 1 percent by weight of the basic polymer, more preferably not less than 2 percent by weight, being dissolved in a solution. These features aid the formation of a uniform polymer membrane without pores being formed therein.

Possible basic polymers for the purposes of the present invention are, inter alia, polybenzimidazoles, polyimidazoles, polyvinylimidazoles and polybenzobisimidazoles. Among these, polybenzimidazoles are preferred.

Preferred polybenzimidazoles correspond to the following formula:

where R is alkylene, perfluoroalkylene or a substituent having one of the following formulae:

where each alkylene and perfluoroalkylene group R preferably has from 1 to 10 carbon atoms, particularly preferably from 1 to 6 carbon atoms.

Polybenzobisimidazoles of the following formula:

where R is as defined above, can also be used as basic polymers.

A strongly acidic group such as a sulfonic acid group (—SO$_3$H), a phosphoric monoester group (—O—P(=O)(OH)$_2$), etc., can be introduced via a linker into the amino group of the polybenzimidazoles or polybenzobisimidazoles.

Possible linkers are the abovementioned groups R. As an alternative thereto, the linker can be a linear or branched hydrocarbon group which has from 1 to 20 carbon atoms and may be substituted by a fluorine atom or be interrupted by an oxygen atom (—O—) or a group of the formula —N(R$^2$)—, where R$^2$ is a hydrogen atom or a lower alkyl group having from 1 to 6 carbon atoms. Possible hydrocarbon groups are: lower alkyl groups which have from 1 to 20 carbon atoms and may be interrupted by an oxygen atom or an arylene group such as a phenylene group and may be branched, and arylene groups, e.g. a phenylene group, which may be substituted by a lower alkyl group having from 1 to 20 carbon atoms, a lower alkoxy group having from 1 to 20 carbon atoms, a sulfonic acid group, an amino group, a fluorine atom, etc. An alternative is a group of the formula —(CR$^3$R$^4$)$_p$—O—(CR$^5$R$^6$)$_q$—, where p and q are each, independently of one another, an interger from 1 to 10 and R$^3$, R$^4$, R$^5$, and R$^6$ are identical or different and are each, independently of one another, a hydrogen atom; a fluorine atom; a lower alkyl group having from 1 to 6 carbon atoms or a lower alkoxy group having from 1 to 6 carbon atoms; an aryl group, e.g. a phenyl group, which may bear a lower alkyl group having from 1 to 6 carbon atoms, a lower alkoxy group having from 1 to 6 carbon atoms, a sulfonic acid group, an amino group, a fluorine atom, etc., as substituent; or a strongly acidic group such as a sulfonic acid group, a phosphoric monoester group, and preferably a hydrogen atom; a fluorine atom or a lower alkyl group having from 1 to 6 carbon atoms.

Thus, for example, a group of the formula >N—(CR$^3$R$^4$)$_r$—SO$_3$H, where N is a nitrogen atom in the imidazole ring of the polybenzimidazole or polybenzobisimidazole; r is an integer from 1 to 20 and R$^3$ and R$^4$ are as defined above, can be introduced into the polybenzimidazoles or polybenzobisimidazoles.

When introducing a strongly acidic group on the nitrogen atom of the polybenzimidazoles or polybenzobisimidazoles via the linker, it is not necessary for the linker and the strong acid to be introduced on all nitrogen atoms. It is also possible for the linker and the strong acid to be introduced on only some of the nitrogen atoms, with bound hydrogen atoms remaining on the other nitrogen atoms. Since the remaining hydrogen atoms can react with the bridging agent, this is preferred.

For example, the linker and the strong acid can be introduced on from 5 to 85 percent of the nitrogen atoms of the basic polymer, e.g. the nitrogen atoms of the imidazole ring, in particular on from 10 to 75 percent of the nitrogen atoms and very particularly preferably on from 15 to 45 percent of the nitrogen atoms.

The basic polymer can be sulfonated or sulfoalkylated by reaction with a sultone in solution. This is carried out using, for example, a solution of from 1 to 30 percent by weight of the basic polymer, in particular a solution of from 5 to 20 percent by weight of the basic polymer. As solvent for the sulfonation or sulfoalkylation, preference is given to using the solvent for the liquid medium described below.

A description of this reaction may be found, for example, in U.S. Pat. Nos. 5,599,639, 4,814,399 and Ahmed Mstafa, Chemical Review, pp. 195–223(1954). All of these documents are hereby expressly incorporated by reference.

The basic polymer is preferably from the group consisting of polybenzimidazoles, polyimidazoles, polyvinylimidazoles and polybenzobisimidazoles. As an alternative, the basic polymer can already have a strongly acidic group in its repeating unit. The presence of the strong acid ensures proton conductivity.

As solvent for the liquid medium, preference is given to a solvent which does not react with the bridging agent. An organic solvent, in particular a polar organic solvent, is preferred. Specific examples of organic solvents are lower amides such as N-methyl-2-pyrrolidone, N,N-dimethylacetamide, dimethylformamide, dimethyl sulfoxide, etc. It is also possible to use a mixture of these solvents. The liquid medium can be either a solution or a suspension. In the case of a solution, the basic polymer is dissolved in the solvent. In the case of a suspension, the particles of the basic polymer serving as disperse phase are dispersed in a solvent serving as continuous phase. As an alternative, the liquid medium can be a slurry or a paste.

A film is subsequently produced (step B) from the solution obtained in step A). For this purpose, the solution is, for example, poured onto a planar substrate and then dried at atmospheric pressure or under reduced pressure. As an alternative, the basic polymer can be converted into the film with the aid of a doctor blade process.

The substrate for casting or the doctor blade process can be a semiconductor, e.g. a silicon wafer, a synthetic polymer, e.g. poly(ethylene terephthalate) or a metal, e.g. stainless steel. If, for example, a roll of poly(ethylene terephthalate) is used as substrate, a continuously operating casting unit can be used for producing a film having a constant width and any thickness. In this case, the solution is poured onto the substrate and runs through a gap having a prescribed gap width and then through a drying oven where it is dried by means of a stream of warm air.

As an alternative, film formation can be carried out by the process described in the Japanese application No. Hei 10-125560. Here, the solution is poured into a cylinder having a cylindrical interior surface and the cylinder is subsequently set into rotation. At the same time, the solvent is allowed to evaporate due to the centrifugal force caused by the rotation, forming a cylindrical polymer film of essentially uniform thickness on the interior surface of the cylinder. By means of this process, the basic polymer can be formed with a uniform matrix. This process described in the Japanese patent application Hei 10-125560 is likewise incorporated by reference into the present description.

Removal of the solvent in step C) can be carried out by drying. To aid drying, heating can be carried out under a reduced pressure of not more than 1 atmosphere, preferably not more than 0.1 atmosphere and more preferably not more than 0.05 atmosphere.

Bridging in step D) is advantageously effected by heating, so that bridging (step D) and drying (step C) can be carried out at the same time in one step.

As an alternative, heating for the purpose of drying the film can be limited to a temperature below the reaction temperature of the bridging reagent, after which the film can be heated more strongly to effect bridging. Heating for the purpose of drying or heating for the purpose of bridging can be carried out using warm air.

Bridging in step D) can also be carried out by irradiation with electromagnetic waves (photochemical reaction).

In the bridging reaction, the epoxide compound of the formula (IIa) is reacted with the polybenzimidazole of the formula (I) to bridge a polymer chain.

In the above formulae, $R^1$ is as defined above.

In a completely analogous manner, the isocyanate compound of the formula (III) is reacted with the polybenzimidazole of the formula (I) to bridge a polymer chain.

In the above formulae, $R^1$ is as defined above.

In the above formulae, different polymer chains are bridged in the interests of simplified presentation. However, it is also possible for bridging of the same polymer chain and an inside of a repeating unit to occur.

For the purposes of the present invention, the basic polymer can be impregnated with a strong acid to make it proton-conducting (step E). Impregnation/doping can be carried out using the strong acid in the form of the liquid medium. As an alternative, impregnation/doping with the strong acid can also be carried out after film formation (step C) but before heating or bridging. Impregnation with the strong acid can also be carried out after heating.

The embodiment in which impregnation is carried out using the strong acid in the form of the liquid medium is based on the addition of a strong acid to the liquid medium. It is preferred that the bridging reagent does not react with the strong acid.

Impregnation with the strong acid is preferably carried out after heating the film in step C). The bridged, basic polymer has an improved mechanical strength and can be handled more easily. Since the bridging reagent has already reacted, the reaction of the strong acid with unreacted bridging reagent is very limited.

The film comprising bridged, basic polymer can be dipped into a strong acid so that the film comprising the basic polymer is impregnated with the strong acid and becomes the membrane. The basic polymer can be dipped into a highly concentrated strong acid at a temperature of at least 35° C., preferably at least 40° C. and more preferably at least 50°, for a period of not more than 5 hours and preferably not more than 1 hour.

Carrying out the dipping step at 35° C. or above makes it possible to shorten the time for which the basic polymer is dipped in the strong acid. With a view to the stability of the basic polymers and the safety precautions necessary for handling strong acids at high temperatures, dipping is carried out at not more than 200° C. or below, preferably at 100° C. or below and very particularly preferably at 80° C. or below.

Possible strong acids are strong protic acids. For example, preference is given to using phosphoric acid and sulfuric acid.

For the purposes of the present description, "phosphoric acid" includes polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$) and metaphosphoric acid. The phosphoric acid, in particular orthophosphoric acid, preferably has a concentration of at least 80 percent by weight, particularly preferably a concentration of at least 90 percent by weight, more preferably a concentration of at least 95 percent by weight and very particularly preferably a concentration of at least 98 percent by weight. The reason for this is that the basic polymer can be impregnated with a greater number of molecules of strong acid as the concentration of the strong acid increases.

The polymer electrolyte membrane obtained according to the invention, namely the complex of the basic polymer and the strong acid, is proton-conducting and can therefore be used advantageously as electrolyte for cells. Nevertheless, the polymer electrolyte is not restricted to use in cells, but can also be used as electrolyte for display elements, electrochromic elements or various sensors.

Possible basic catalysts are basic oxides and hydroxides of elements of main groups I, II and III of the Periodic Table, hydrides of elements of main group I of the Periodic Table and organolithium compounds, preferably KOH, LiOH, NaOH, RbOH, CsOH, $Ca(OH)_2$, $Mg(OH)_2$, $Ba(OH)_2$, LiH, NaH, KH, methyllithium and butyllithium.

The basic catalyst is added in amounts of from 0.01 to 5 mol %, preferably from 0.02 to 3 mol %, particularly preferably from 0.5 to 2.5 mol %, based on the bridging reagent used, to the solution obtained in step A).

The invention also provides for the preferred use of the polymer electrolyte membrane of the invention in a single cell (MEU) of a fuel cell.

The single cell of a fuel cell comprises a polymer electrolyte membrane according to the invention and two electrodes between which the polymer electrolyte membrane is located in a sandwich arrangement.

The electrodes each have a catalytically active layer and a gas diffusion layer for transporting a reaction gas to the catalytically active layer. The gas diffusion layer is porous so that reactive gas can pass through it.

The polymer electrolyte membrane of the invention can be used as electrolyte membrane. In addition, the electrolyte membrane and a precursor for a single cell (MEU) with one or both catalytically active layers can be produced. Furthermore, the single cell can also be produced by fixing the gas diffusion layer onto the precursor.

The present invention further provides a fuel cell comprising a plurality of single cells (MEUs) which each comprise a membrane comprising a bridged polymer produced by the above process and two electrodes between which the membrane comprising the bridged polymer is located in a sandwich arrangement.

The membranes produced by means of the process of the invention display a fracture toughness which is more than 100% above that of the unbridged polymer.

Furthermore, the membranes of the present invention display a tensile stress of at least 1.5 MPa at an elongation at break of at least 60%, preferably a tensile stress of at least 2 MPa at an elongation at break of at least 80%.

Figure 1:
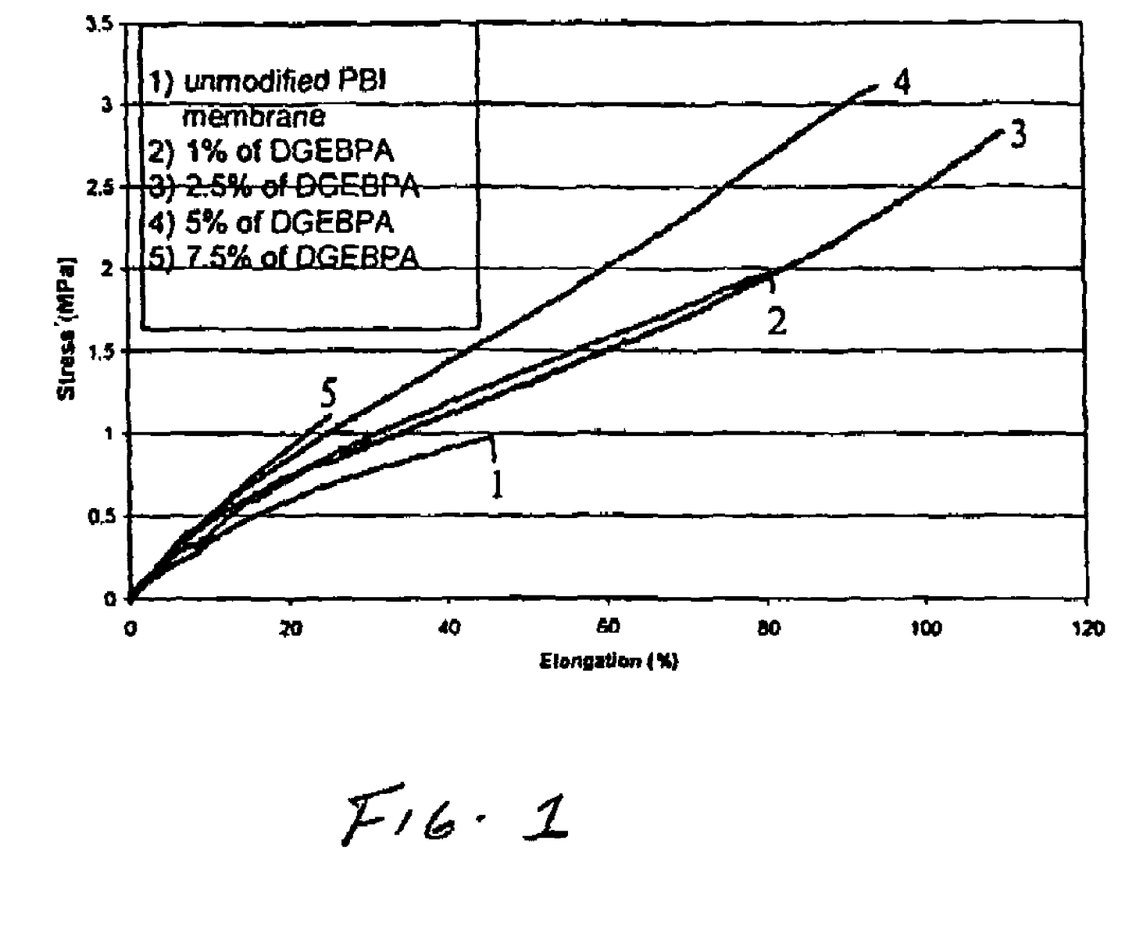
FIG. 1: Stress-strain curve of membranes according to the invention (2,3,4) and an unbridged polymer (1) and also at an excessively high proportion of bridging reagent (5)

It can be seen from FIG. 1 that the fracture toughness (area under the curve) is significantly improved compared to the unbridged polymer or a polymer containing an excessively high proportion of bridging reagent.

The measurement of the elongation at break/stress is carried out on test bars having a width of 15 mm and a length of 120 mm. The tensile test is carried out at a temperature of 100° C. and an elongation speed of 50 mm/min.

| Mol % of BPADGE | E modulus [Mpa] | Tensile strength [MPa] | Elongation at break [%] | Fracture toughness [kJ/m²] |
|---|---|---|---|---|
| 0 | 3.9 | 1 | 47 | 29.5 |
| 1 | 4.6 | 2 | 82.6 | 98 |
| 2.5 | 6.8 | 2.85 | 98.2 | 158 |
| 5 | 5.3 | 3.2 | 99 | 172 |
| 7.5 | 5.6 | 1.2 | 30 | 20 |

Figure 2:
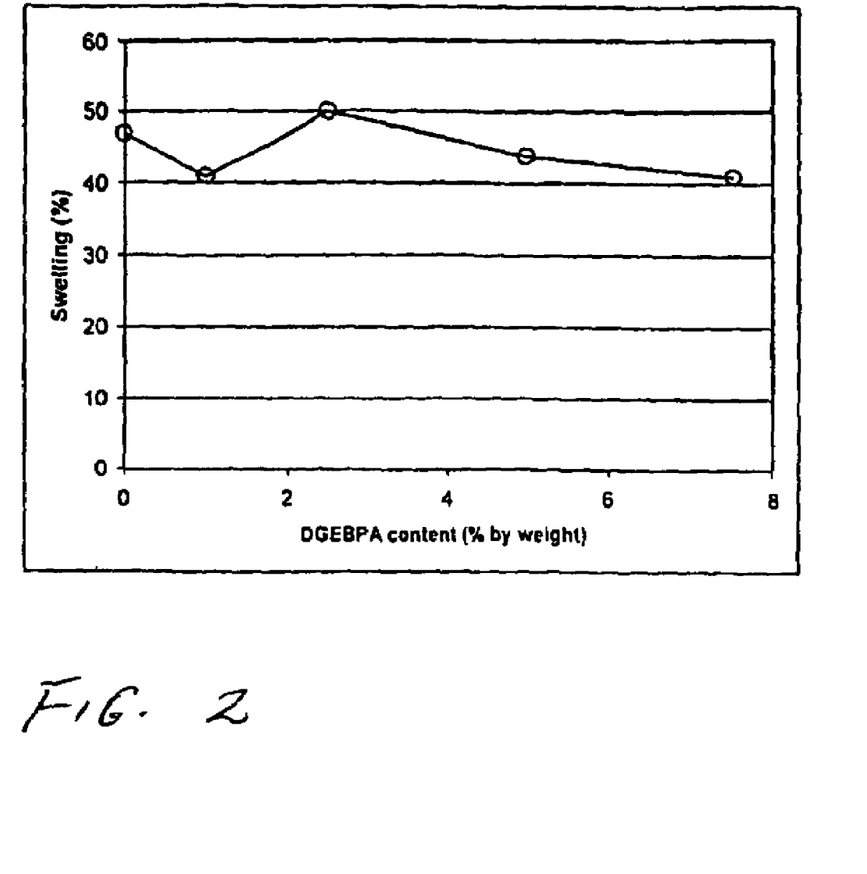
FIG. 2: Shows the membrane swelling behavior versus the percentage of DGEBPA.

It is pleasing to note that the membranes according to the invention display a virtually unchanged swelling behavior in the range from 40 to 50%.

EXAMPLES

Bridging Using a Constant Addition of KOH

A 15% strength PBI solution (150 gram, 0.4870 mol) is bridged with 1, 2.5, 5 and 7.5 mol % of BPADGE, respectively, using the following method.

Bridging Method:

The PBI solution is placed in a flask and degassed by means of argon. 10 mg of KOH are then added to the PBI solution and the mixture is stirred at 60° C. for 30 minutes. The bridging reagent is then added and the mixture is stirred at 60° C. for a further 1 hour. The solution is degassed and cast to produce a film. The film is then [lacuna] in a temperature range from 30 to 200° C. for a period of 15–30 minutes. The films obtained in this way were doped with 85% strength $H_3PO_4$ for at least 72 hours. The measurements were subsequently carried out.

What is claimed is:

1. A membrane comprising a bridged polymer obtained by a process comprising the following steps:
   A. preparing a solution comprising a basic polymer having at least one amino group in a repeating unit and at least one bridging reagent in a suitable solvent,
   B. casting a film using the solution obtained from step A),
   C. removing the solvent from step A),
   D. carrying out a bridging reaction in the film obtained in step C),
   E. doping the film obtained in step D) with a strong acid,
   wherein a basic catalyst is additionally added in step A) and said basic catalyst is a basic oxide of elements of main groups I, II and III of the Periodic Table, a basic hydroxide of elements of main groups I, II and III of the Periodic Table, a hydride of elements of main group I of the Periodic Table or an organolithium compound.

2. A membrane as claimed in claim 1, wherein the bridging reagent has at least two epoxide groups or isocyanate groups per molecule.

3. A membrane as claimed in claim 1, wherein the bridging reagent is at least one compound of the formula (II) and/or (III)

where R is alkylene, perfluoroalkylene or a substituent having one of the following formulae:

where each alkylene and perfluoroalkylene group R has from 1 to 10 carbon atoms.

11. A membrane as claimed in claim 10, wherein R is an alkylene or perfluoroalkylene group that has from 1 to 6 carbon atoms.

12. A membrane as claimed in claim 9, wherein the polybenzobisimidazole used is a polymer of the formula where R is as defined in claim 10.

13. A membrane as claimed in claim 1, wherein bridging in step D) is effected by heating so that bridging (step D) and drying (step C) are carried out at the same time in one step.

where $R^1$ is a hydrocarbon group having from 1 to 30 carbon atoms.

4. A membrane as claimed in claim 3, wherein $R^1$ is where m, k and l are identical or different and are each an integer from 1 to 6.

5. A membrane as claimed in claim 1, wherein the bridging reagent contains at least three epoxide groups per molecule.

6. A membrane as claimed in claim 5, wherein the bridging reagent is the compound

7. A membrane as claimed in claim 1, wherein the bridging reagent is bisphenol A glycidyl ether [BPAGDE] and/or 1,4-butanediol diglycidyl ether.

8. A membrane as claimed in claim 1, wherein the solution obtained in step A) contains from 0.1 to 7 mol% of the bridging reagent per unit of the basic polymer.

9. A membrane as claimed in claim 1, wherein the basic polymer used is polybenzimidazole, polyimidazole, polyvinylimidazole or polybenzobisimidazole.

10. A membrane as claimed in claim 9, wherein the polybenzimidazole used is a polymer of the formula;

14. A membrane as claimed in claim 1, wherein drying of the film is carried out at a temperature below the reaction temperature of the bridging reagent and the film is subsequently heated further to effect bridging.

15. A membrane as claimed in claim 1, wherein bridging in step D) is effected by irradiation with electromagnetic waves (photochemical reaction).

16. A membrane as claimed in claim 1, wherein the strong acid used in step E) is phosphoric acid or sulfuric acid.

17. A membrane as claimed in claim 1, wherein basic catalysts used are KOH, LiOH, NaOH, RbOH, CsOH, $Ca(OH)_2$, $Mg(OH)_2$, $Ba(OH)_2$, LiH, NaH, KH, methyllithium and/or butyllithium.

18. A membrane as claimed in claim 1, wherein the basic catalyst is added in amounts of from 0.01 to 5 mol %, based on the bridging reagent used, to the solution obtained in step A).

19. A membrane as claimed in claim 1 which has a fracture toughness which is more than 100% above that of a membrane containing no bridges.

20. A membrane as claimed in claim 1 which has an elongation at break of at least 60% and an ultimate tensile strength of at least 1.5 MPa.

21. A membrane-electrode unit comprising at least one electrode and at least one membrane as claimed in claim 1.

22. A fuel cell comprising at least one membrane-electrode unit as claimed in claim 21.

* * * * *

UNITED STATES PATENT AND TRADEMARK OFFICE
CERTIFICATE OF CORRECTION

PATENT NO.        : 7,229,553 B2                                          Page 1 of 1
APPLICATION NO. : 10/468988
DATED             : June 12, 2007
INVENTOR(S)       : Oemer Uensal et al.

It is certified that error appears in the above-identified patent and that said Letters Patent is hereby corrected as shown below:

In the Claims:

In Claim 6, in column 11, on line 50 should read -- -- .

In Claim 10, in column 11, on line 67, "polybenzimidazole used is polymer of the formula;" should read -- polybenzimidazole used is polymer of the formula:--.

Signed and Sealed this

Thirty-first Day of July, 2007

JON W. DUDAS
*Director of the United States Patent and Trademark Office*